United States Patent
Recchia et al.

(10) Patent No.: US 9,440,827 B2
(45) Date of Patent: Sep. 13, 2016

(54) LIFT MAST HEIGHT SENSOR FOR AN INDUSTRIAL TRUCK

(71) Applicant: Jungheinrich Aktiengesellschaft, Hamburg (DE)

(72) Inventors: John Recchia, Detroit, MI (US); Kelvin Chan, Jersey Village, TX (US)

(73) Assignee: Jungheinrich Aktiengesellschaft, Hamburg (DE)

( * ) Notice: Subject to any disclaimer, the term of this patent is extended or adjusted under 35 U.S.C. 154(b) by 231 days.

(21) Appl. No.: 14/221,049

(22) Filed: Mar. 20, 2014

(65) Prior Publication Data
US 2015/0266708 A1    Sep. 24, 2015

(51) Int. Cl.
*B66F 9/075* (2006.01)
*B66F 9/08* (2006.01)
*G01B 3/10* (2006.01)
*G01B 7/04* (2006.01)

(52) U.S. Cl.
CPC ............... *B66F 9/0755* (2013.01); *B66F 9/08* (2013.01); *G01B 3/1061* (2013.01); *G01B 7/04* (2013.01); *G01B 2003/1079* (2013.01)

(58) Field of Classification Search
CPC .............. B66F 9/0755; G01B 3/1061; G01B 2003/1079; G01B 7/04
See application file for complete search history.

(56) References Cited

U.S. PATENT DOCUMENTS

| | | | | |
|---|---|---|---|---|
| 4,658,134 A | * | 4/1987 | Okumura | G01B 3/1061 250/230 |
| 4,747,215 A | * | 5/1988 | Waikas | G01B 3/1061 33/763 |
| 5,749,696 A | * | 5/1998 | Johnson | B66F 9/082 187/393 |
| 6,011,389 A | * | 1/2000 | Masreliez | G01D 5/2046 324/207.17 |
| 6,269,913 B1 | * | 8/2001 | Kollmannsberger | B66F 9/0755 187/222 |
| 6,533,076 B1 | * | 3/2003 | Haverfield | B66F 9/0755 187/222 |
| 6,877,587 B2 | * | 4/2005 | Kunz | B66B 1/3492 187/394 |
| 7,266,904 B2 | * | 9/2007 | Hammerl | B66F 9/0755 177/229 |
| 8,600,628 B2 | * | 12/2013 | Haemmerl | B66F 9/0755 701/50 |
| 2006/0059702 A1 | * | 3/2006 | Hammerl | G01D 5/2457 33/706 |
| 2011/0101964 A1 | * | 5/2011 | Ausserlechner | G01D 5/145 324/207.11 |

FOREIGN PATENT DOCUMENTS

DE    102 07 017 A1    8/2003

* cited by examiner

*Primary Examiner* — Minh Truong
(74) *Attorney, Agent, or Firm* — Walter Ottesen, P.A.

(57) ABSTRACT

A lift mast for an industrial truck has a plurality of frames disposed within one another that are adjustable in height relative to one another. A lift height sensor assembly has a pulse generator and a sensor unit. The pulse generator is configured as an elongated element disposed on one frame and the sensor unit is disposed on a second frame. The sensor unit has a sensor head having at least one running wheel. The sensor head is mounted pivotably and the running wheel rests against the first frame or pulse generator under pretension using a resilient element.

9 Claims, 4 Drawing Sheets

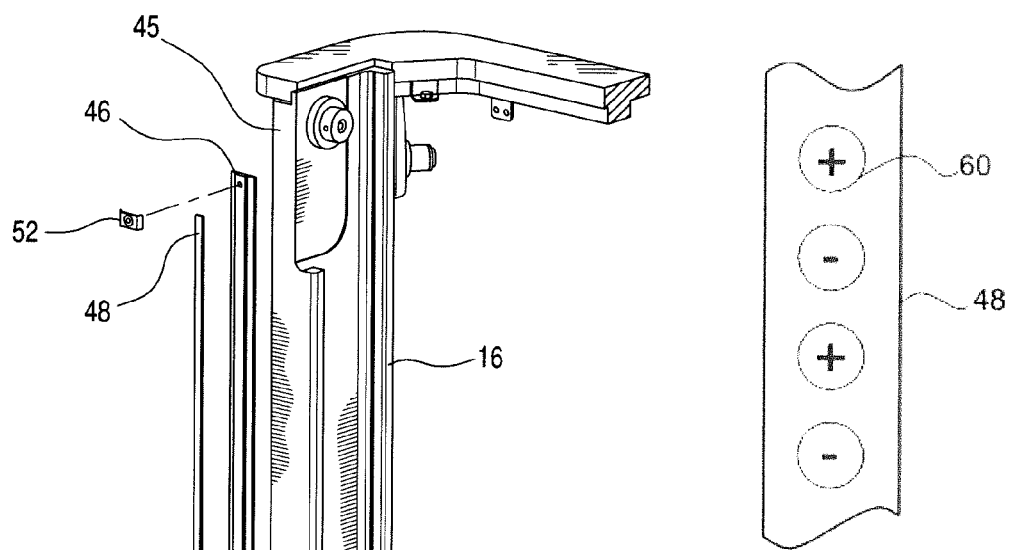
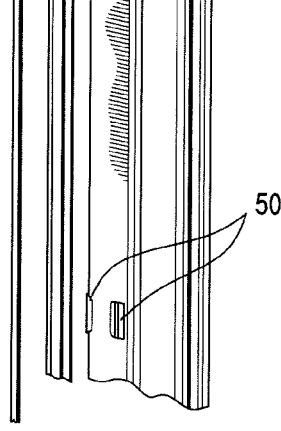
FIG. 4
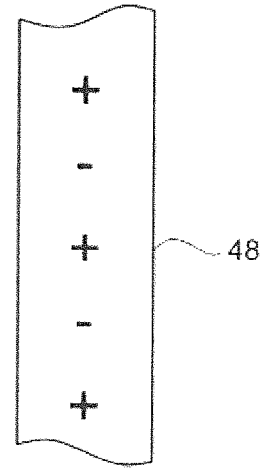
FIG. 4A
FIG. 4B

LIFT MAST HEIGHT SENSOR FOR AN INDUSTRIAL TRUCK

FIELD OF THE INVENTION

The present invention relates to a lift mast for an industrial truck. The lift mast has a plurality of frames disposed within one another that are adjustable in height relative to one another. The lift mast has a lift height sensor for measuring the lift height of the frames relative to each other.

BACKGROUND OF THE INVENTION

From DE 102 07 017 A1, an apparatus is known for measuring the lift height of a load support device on a lift frame. The lift mast itself has a stationary frame fixed to the vehicle and at least one extendable lift frame. The height measuring apparatus has a measuring sensor and at least one position generator that is movable in height. The position generator is designed as an elongated generator disposed in the region of the lift mast that interacts in a contact-free manner with a measuring sensor fastened to the stationary frame.

The contact-free measurement has the advantage that no wear occurs at the measuring apparatus. However, measuring inaccuracies can occur that arise due to a relative movement between the measuring sensor and the position generator.

SUMMARY OF THE INVENTION

It is an object of the invention to provide a lift mast for an industrial truck with which a lift height of two components, movable relative to one another, can be reliably measured using simple means.

The object according to the invention is achieved by a lift mast for an industrial truck having at least two frames disposed one within the other and being adjustable in height relative to each other; a lift height sensor assembly having a pulse generator configured as an elongated member and disposed on a first one of the frames; the lift height sensor assembly further having a sensor unit disposed on a second one of the frames; the sensor unit including a pivotably mounted sensor head having at least one running wheel; a resilient element; and, the running wheel being configured to rest against one of the first frame and the pulse generator under pretension generated via the resilient element.

The lift mast according to the invention is provided for an industrial truck. The lift mast includes a plurality of mast frames disposed within one another that are adjustable in height relative to each other. In general, the lift mast is mounted to the industrial truck with the outer mast frame of the lift mast. The lift mast according to the invention is equipped with at least one lift height sensor assembly that has a pulse generator and a sensor unit. The pulse generator is configured as an elongated element disposed on a first one of the mast frames and the sensor unit is disposed on a second mast frame in such a manner that it is aligned to the pulse generator. According to a feature of the invention, the sensor unit has a sensor head having at least one running wheel. The sensor head is mounted pivotably, and using an elastic or resilient element, rests with the running wheel resiliently biased against the pulse generator or on the mast frame supporting the pulse generator. Due to a rolling motion of the running wheel on the mast frame or on the pulse generator, there is a constant distance between the sensor head and the pulse generator. As a result, measurement errors caused by varying distances between the sensor head and the pulse generator are avoided. The pretensioning of the elastic element by which the running wheel is pressed against the first mast frame or the pulse generator, ensures that even with a non-uniform height movement of the lift mast, a constant distance is always present between the sensor head and the pulse generator.

In a preferred embodiment, the sensor head is equipped with two running wheels disposed parallel to each other and at a spaced relationship to one another. The running wheels are preferably disposed on opposite sides of the pulse generator. In this manner, the pulse generator is located between the running wheels.

In a further preferred embodiment, the pulse generator is fastened to a mast frame that is adjustable in height. The pulse generator has a plastic profile and a magnetic strip, of which the plastic profile is retained on the mast frame and the magnetic strip is retained on the plastic profile. The configuration of the pulse generator in the form of a plastic profile and a magnetic strip retained therein simplifies the assembly and the fastening thereof to the mast frame. Additionally, such a pulse generator requires little space in the lift frame.

In a further preferred embodiment, the plastic profile is implemented as a U-shaped retainer, in the recess of which the magnetic strip, having a cross-section corresponding thereto, is disposed.

In a preferred embodiment, the magnetic strip is adhesively bonded in the U-shaped receptacle of the retainer.

In a further preferred embodiment, magnetic elements, oriented with polarity opposing each other, are incorporated in the magnetic strip. The sensor assembly records the alternating polarity of the magnetic elements in order to measure the path covered relative to each other.

In a preferred embodiment, the magnetic strip is extruded with the magnetic elements thereof. Here, the magnetic elements can be produced during or after the extrusion using an appropriate magnetic orientation in the material. It is also possible that the magnetic elements as separately configured magnetic bodies are extruded also during the production of the magnetic strip.

BRIEF DESCRIPTION OF THE DRAWINGS

The invention will now be described with reference to the drawings wherein:

FIG. 4 is an exploded diagram for the pulse generator at the middle mast frame;

FIG. 4A shows a segment of the magnetic strip wherein the magnetic elements of opposing polarity are shown;

FIG. 4B shows a segment of the magnetic strip wherein the magnetic strip is extruded and the magnetic elements are represented by alternating polarity signs;

DESCRIPTION OF THE PREFERRED EMBODIMENTS OF THE INVENTION

Figure 1:
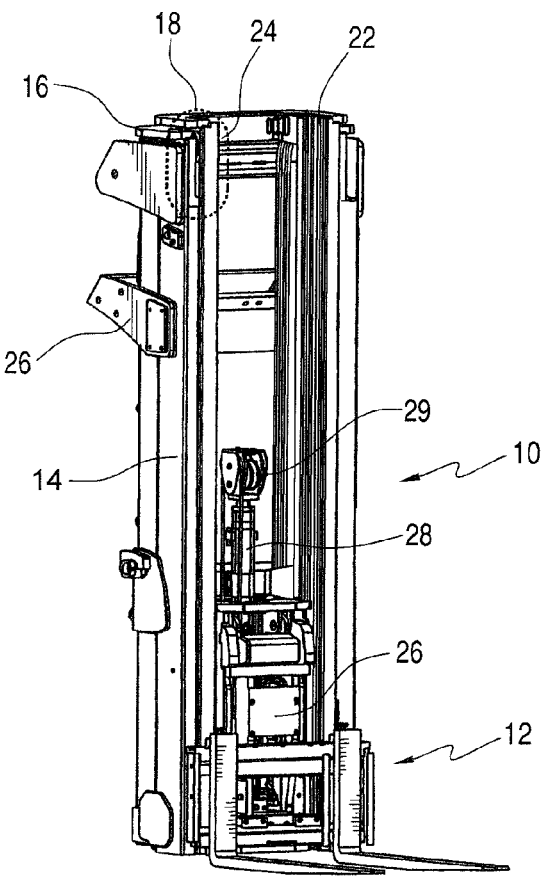
FIG. 1 shows a lift mast for assembly on an industrial truck having a height measuring apparatus according to the invention between an outer mast frame fixed to the vehicle and a middle frame movable with respect thereto.

FIG. 1 shows a lift mast 10 which is not mounted to the industrial truck. The lift mast 10 has a load support 12 in the form of two parallel fork arms. The lift mast 10 itself includes three frames disposed within one another, of which the outer frame 14 is provided as a fixed frame for assembly on the industrial truck. A middle frame 16, disposed within the outer frame 14, is supported adjustable in height in the outer frame 14. An inner frame 18 is again supported movably in the middle frame 16. The load support 12 with its load carriage 20 is disposed adjustable in height on the inner frame 18.

The frames 14, 16, 18 each have two parallel rails opposite each other, of which as an example in FIG. 1, the rails 22, 24 of the inner frame 18 can be seen. The rails of each of the frames are connected together via one or more cross members. In FIG. 1, for example, the cross member 26 of the outer frame pair can be seen.

The height adjustment of the load support 12 occurs using a hydraulic cylinder 28 and an appropriate deflection roller 29, wherein for clarity a diverted lift chain is not shown in FIG. 1. Along with free lift of the load support 12 relative to the inner frame 18, the middle frame 16 can also be raised telescopically with respect to the stationary frame 14, and the inner frame 18 can be raised telescopically with respect to the middle frame 16. The extension of the frames is also called mast lift. The drives and/or lift cylinders responsible for the mast lift are, in general, disposed on the side of the lift mast, in order to not limit the visibility between the rails of the frame, and to attain good visibility and a constructive depth for the lift mast that is not too large.

Figure 2:
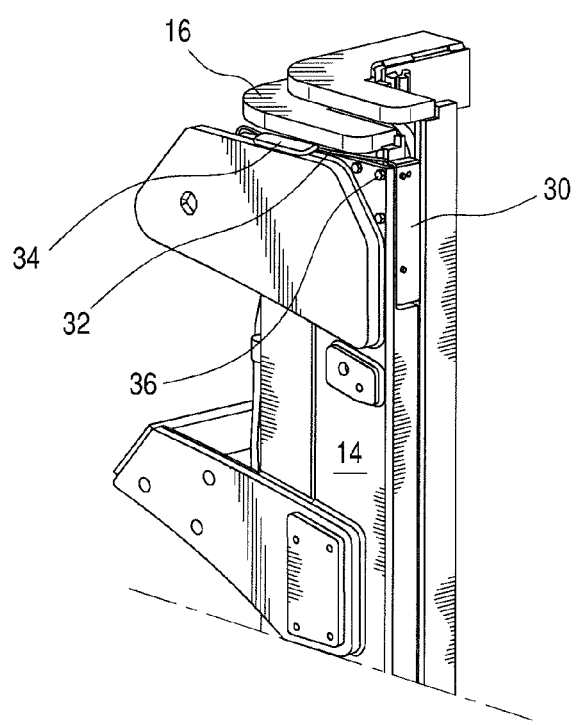
FIG. 2 is a detailed view from FIG. 1.

FIG. 2 shows a lift height sensor, which measures the lift height between the outer frame 14, fixed to the vehicle, and the height adjustable middle frame 16. The lift height sensor is disposed in the side of the middle frame 16 facing toward the load support, whereby the inner space between the rails that is important for visibility is not obstructed. A cover 30 mounted at the upper end of the lift frame covers a sensor head. The associated cables 32 to the sensor head are guided out and fixed via a cable retainer 34. The sensor head is fastened to the outer frame 14 using three bolts 36.

Figure 3:
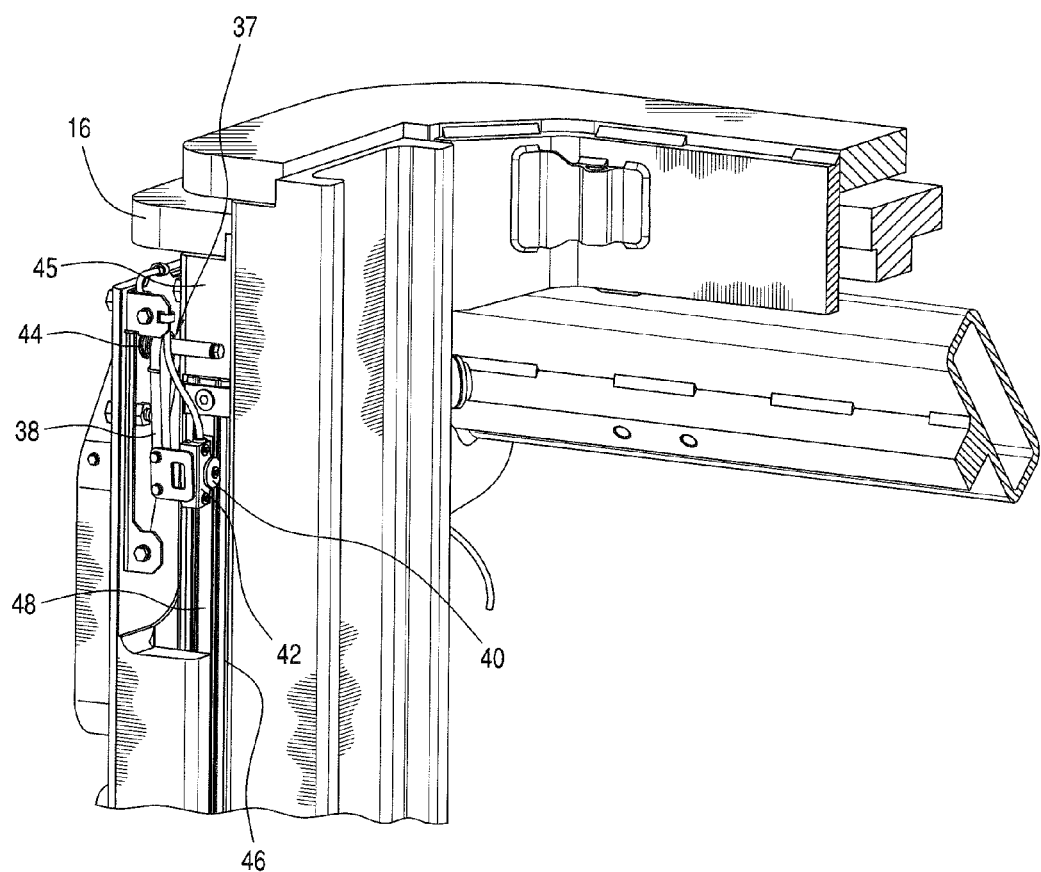
FIG. 3 is a detailed view from FIG. 2 with exposed sensor head.

FIG. 3 shows a view of the sensor head 37 and the measuring device with the cover 30 removed. The sensor head 37 itself has an arm 38 which at the end thereof has two running wheels 40. A magnetic sensor 42 is fastened to the arm 38 in the region of the running wheels 40. The arm 38 is pressed via a torsion spring 44 toward the face side 45 of the middle frame 16, such that the running guide wheels 40 roll on a plastic rail 46. A magnetic strip 48 is retained centrally in the plastic rail 46 and interacts with the magnetic sensor 42, in order to detect a relative movement between the outer frame 14 and the middle frame 16.

FIG. 4 shows in a perspective view the middle frame 16 in the region of the upper end thereof. The face side 45, to which the plastic rail 46 is fastened, can be seen clearly. For fastening, retainers 50 that laterally encompass the plastic rail 46 can be provided on the face side 45. The upper end of the plastic rail 46 can be fastened using a retainer clip 52 which is, for example to be screwed on.

Also, FIG. 4 shows the magnetic strip 48, which is inserted in the plastic rail 46. As shown in FIG. 4A, magnetic elements 60 with opposing polarity alternate in the magnetic strip 48. The regions of opposite polarity have a constant distance. FIG. 4B shows a segment of magnetic strip 48 wherein the magnetic strip is extended with the magnetic elements thereof. The magnetic elements can be produced during or after extrusion and are here schematically represented by the alternating polarity signs.

Figure 5:
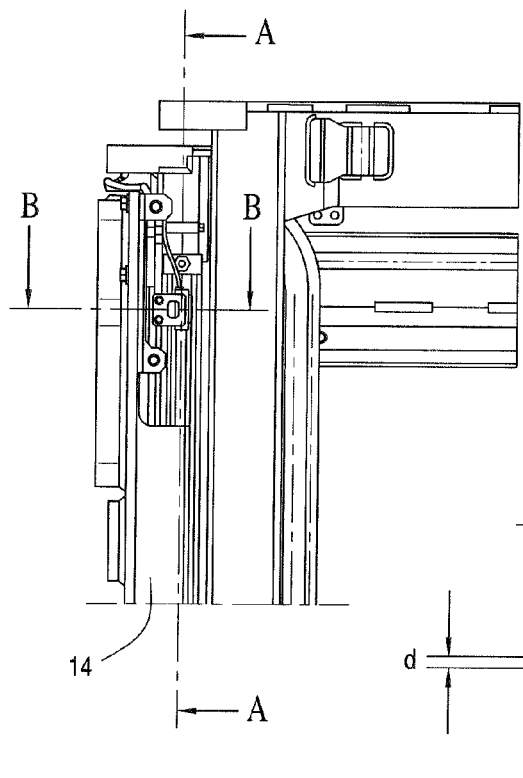
FIG. 5 is a detailed view of the sensor head.

FIG. 5 shows a detailed view from the front of the outer frame 14 with the cover 30 removed.

Figure 6:
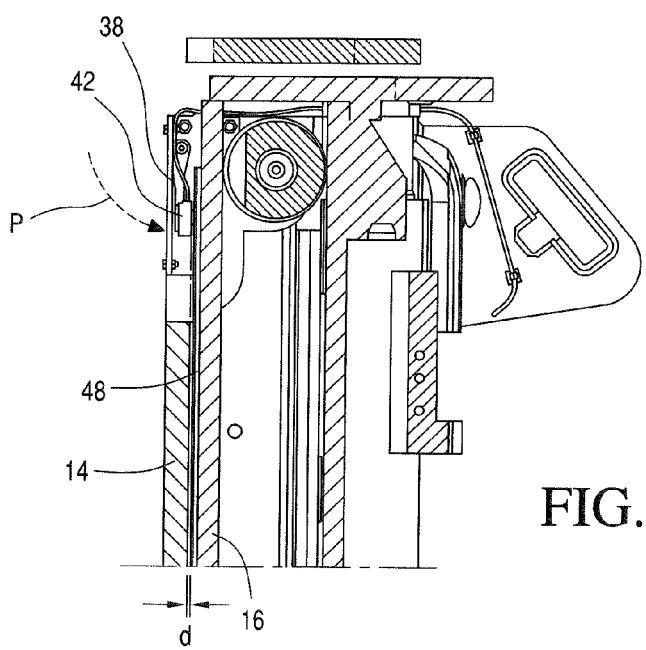
FIG. 6 shows a section along the longitudinal line A-A from FIG. 5.

FIG. 6 shows the section along the line A-A from FIG. 5. It can be seen here how the magnetic sensor 42 is disposed on the arm 38. The magnetic sensor 42 is pressed along the arrow P in the direction of the middle frame 16. The magnetic sensor 42 is at a distance d with respect to the magnetic strip 48 disposed at the middle frame 16. In FIG. 6, the running wheels 40 are either removed or covered by the magnetic sensor 42.

Figure 7:
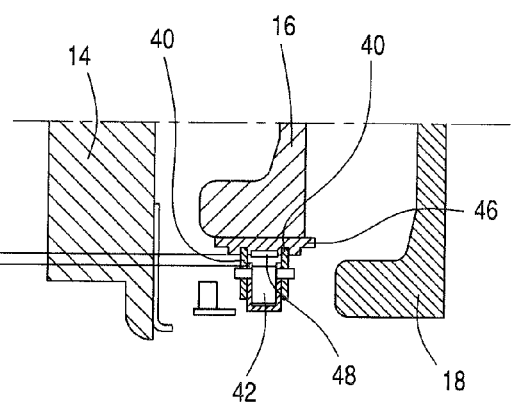
FIG. 7 shows a section along the transverse line B-B of FIG. 5.

FIG. 7 shows the section along the line B-B of FIG. 5. The section represented in FIG. 7 shows the magnetic sensor 42 with the laterally disposed running wheels 40. The running wheels 40 run on the plastic rail 46 at the side of the magnetic strip 48. The distance between the magnetic strip 48 and the magnetic sensor 42 is identified by reference character d.

It is understood that the foregoing description is that of the preferred embodiments of the invention and that various changes and modifications may be made thereto without departing from the spirit and scope of the invention as defined in the appended claims.

REFERENCE NUMERALS 10 lift mast
12 load support means
14 outer frame
16 middle frame
18 inner frame
20 load carriage
22 rail
24 rail
26 cross member
28 cylinder
29 deflection roller
30 cover
32 cable
34 cable retainer
36 bolt
37 sensor head
38 arm
40 running wheels
42 magnetic sensor
44 spring
45 face side
46 plastic rail
48 magnetic strips
50 retainer
52 retainer clip

What is claimed is:

1. A lift mast for an industrial truck, said lift mast defining a longitudinal axis and comprising:
    at least two frames disposed one within the other and being adjustable in height relative to each other;
    a lift height sensor assembly including a pulse generator configured as an elongated member and disposed on a first one of said frames;
    said lift height sensor assembly further including a sensor unit disposed on a second one of said frames;
    said sensor unit including a pivotably mounted sensor head having at least one running wheel;
    a resilient element;

said running wheel being configured to rest against one of said first frame and said pulse generator under pretension generated via said resilient element;

said pulse generator being fastened to said first one of said frames;

said pulse generator having a plastic profile and a magnetic strip;

said plastic profile being held at said first one of said frames; and, said magnetic strip being held on said plastic profile and extending in the direction of said longitudinal axis.

2. The lift mast of claim 1, wherein said plastic profile is configured as a U-shaped retainer and said magnetic strip has a corresponding rectangular cross-section.

3. The lift mast of claim 2, wherein said magnetic strip is one of adhesively bonded and welded to said retainer.

4. The lift mast of claim 1, wherein said magnetic strip includes at least two magnetic elements having oppositely oriented polarities.

5. The lift mast of claim 1, wherein said magnetic strip is extruded with magnetic elements thereof.

6. A lift mast for an industrial truck comprising:
at least two frames disposed one within the other and being adjustable in height relative to each other;
a lift height sensor assembly having a pulse generator configured as a magnetic strip and disposed on a first one of said frames;
said lift height sensor assembly further having a sensor unit disposed on a second one of said frames;
said sensor unit including a pivotably mounted sensor head having at least one running wheel;
a resilient element;
said running wheel being configured to rest against one of said first frame and said pulse generator under pretension generated via said resilient element so as to maintain a substantially constant gap between said sensor head and said magnetic strip as said first and second frames move relative to each other; and,
said magnetic strip being configured to have magnetic regions with opposing polarity alternating therein.

7. The lift mast of claim 6, wherein said sensor head has two running wheels disposed in parallel to each other and in a spaced relationship to each other.

8. The lift mast of claim 7, wherein said running wheels are disposed on opposite sides of said pulse generator.

9. A lift mast for an industrial truck comprising:
at least two frames disposed one within the other and being movable in elevation relative to each other;
a lift height sensor assembly having a pulse generator configured as a magnetic strip and disposed on a first one of said frames;
said lift height sensor assembly further having a sensor unit disposed on a second one of said frames;
said sensor unit including a pivotably mounted sensor head having at least one running wheel;
said sensor head and said magnetic strip conjointly defining a gap (d) therebetween; and,
said sensor unit further including a biasing device for resiliently biasing said sensor head toward said magnetic strip causing said running wheel to be in continuous contact engagement with said first frame so as to cause said gap (d) to remain substantially constant as said first and second frames move relative to each other.

* * * * *